US008091135B2

(12) United States Patent
Kobayashi et al.

(10) Patent No.: US 8,091,135 B2
(45) Date of Patent: Jan. 3, 2012

(54) COMPUTER SYSTEM AND VIRUS-SCAN METHOD

(75) Inventors: Ikuko Kobayashi, Kawasaki (JP);
 Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 751 days.

(21) Appl. No.: 12/007,939

(22) Filed: Jan. 17, 2008

(65) Prior Publication Data
 US 2009/0089880 A1 Apr. 2, 2009

(30) Foreign Application Priority Data

Sep. 28, 2007 (JP) .................................. 2007-255898

(51) Int. Cl.
 *G06F 12/14* (2006.01)
 *G08B 23/00* (2006.01)

(52) U.S. Cl. ......................................................... 726/24

(58) Field of Classification Search ...................... 726/24
 See application file for complete search history.

(56) References Cited

U.S. PATENT DOCUMENTS

| 5,991,753 | A | * | 11/1999 | Wilde | .................................. | 1/1 |
| 2005/0132206 | A1 | * | 6/2005 | Palliyil et al. | ................. | 713/188 |
| 2007/0074290 | A1 | | 3/2007 | Kobayashi et al. | | |
| 2007/0156985 | A1 | * | 7/2007 | Tsai et al. | ...................... | 711/162 |
| 2008/0263658 | A1 | * | 10/2008 | Michael et al. | .................. | 726/22 |

FOREIGN PATENT DOCUMENTS

JP 2007-094803 4/2007

* cited by examiner

*Primary Examiner* — Jason Gee
(74) *Attorney, Agent, or Firm* — Volpe and Koenig, P.C.

(57) ABSTRACT

A computer system uses a virus-scan method capable of full-scanning the logical volume of a SUTOSEN PC with high frequency while limiting the number of virus-scan devices. The computer system includes a primary volume storing data from a personal computer, a snapshot volume storing the status of the primary volume at a given point in time, and a save destination volume storing an updated memory area within the primary volume as information on an updated block address reflected in a bitmap. The updated block address corresponds to a memory area within the primary volume. The computer system detects only an updated file in the primary volume from the snapshot volume and the save destination volume, creates an updated volume for storing a relevant updated file, and thereby executes a virus-scan on the updated volume.

11 Claims, 17 Drawing Sheets

FIG.6

| LU NUMBER (218A) | EXECUTION FREQUENCY (218B) | EXECUTION DATE (218C) | ACTUAL USED VOLUME (218D) | UPDATED BLOCK VOLUME (218E) | EXECUTION TIME (218F) |
|---|---|---|---|---|---|
| #1 | ONCE / DAY | 2007/07/01 | 15GB | 3GB | 15 MINUTES |
| #2 | ONCE / DAY | 2007/01/01 | 10GB | 5GB | 35 MINUTES |
| ⋮ | ⋮ | ⋮ | ⋮ | ⋮ | ⋮ |

| LU NUMBER (219A) | PC ADDRESS (219B) |
|---|---|
| #1 | 10.20.30.11 |
| #2 | 10.20.30.12 |
| ⋮ | ⋮ |

| 220A | 220B | 220C | 220D | 220E | 220F | 220G |
|---|---|---|---|---|---|---|
| LU NUMBER | UPDATED BLOCK SIZE | SAVE DESTINATION LU | GENERATION NUMBER | STORED NUMBER | STORED ARRAY NUMBER | LATEST SAVE DATE |
| #1 | 32KB | #201 | 7 | 7 | 2 | 2007/07/07 |
| #2 | 32KB | #202 | 7 | 2 | 2 | 2007/07/07 |
| ⋮ | ⋮ | ⋮ | ⋮ | ⋮ | ⋮ | ⋮ |

220

COMPUTER SYSTEM AND VIRUS-SCAN METHOD

CROSS-REFERENCES TO RELATED APPLICATIONS

This application relates to and claims priority from Japanese Patent Application No. 2007-255898, filed on Sep. 28, 2007, the entire disclosure of which is incorporated herein by reference.

BACKGROUND

Field of the Invention

The invention relates to a computer system and a virus-scan method. More specifically, the invention relates to a virus-scan method in a computer system wherein a disk that is equivalent to a local disk in a personal computer is loaded in a network-type storage device and the personal computer utilizes this storage device using a SAN (Storage Area Network).

To prevent infection by a virus, a user regularly checks a personal computer for viruses. The user can identify the period during which virus infection occurred of viruses; however, viruses fabricate the date and time files are created, so it is impossible to scan only the files that are updated within a certain period of time based on their date and time created, updated or accessed. As a result, existing virus-scan software has had to virus-scan all files stored in a storage area (hereinafter referred to as "full-scan"). Since this full-scan is a heavy workload for a personal computer, it has been performed on all personal computers at once during lunch break hours, etc.

Meanwhile, recently network-type storage devices (hereinafter referred to as "storage device"), which are capable of connecting to a plurality of personal computers via iSCSI (Internet Small Computer System Interface) or FC (Fibre Channel), are being used. In a computer system using this kind of storage device, each personal computer uses, in place of a local hard disk drive, a memory area (hereinafter referred to as "logical volume LU: Logical Unit") into which the storage area of a plurality of local disk drives loaded in the storage device is logically divided. Note that the personal computers connected to this network-type storage device are hereinafter referred to as SUTOSEN PCs.

As a virus-scan method in a SUTOSEN PC, for example, the content of JP2007-094803 A, which is outlined below, has been suggested. The computer system disclosed in JP2007-09483 A has a configuration where a storage device and a virus-scan device are connected via a SUTOSEN PC and a network. In every SUTOSEN PC, a primary logical volume storing data from the SUTOSEN PC and a secondary logical volume storing backup data are created in pairs. The SUTOSEN PC makes an I/O request such as a file creation, etc, to the primary logical volume. The virus-scan device synchronizes the primary and secondary logical volumes, and virus-scans only all the secondary logical volumes at once. Since it is not necessary for the SUTOSEN PC to execute a virus-scan in the computer system disclosed in JP2007-094803 A, the execution rate for a virus search or virus disinfection processing can be improved (see JP2007-094803 A).

SUMMARY

In conventional methods, a virus-scan device virus-scans all files stored in a logical volume. Consequently, it takes time to scan a logical volume equivalent to one SUTOSEN PC. For example, it takes two hours to virus-scan a 30 GB logical volume. Even if all the hours in a day are spent virus-scanning, one virus-scan device can only execute virus-scanning for a logical volume equivalent to twelve SUTOSEN PCs. For this reason, if a storage device has a logical volume equivalent to two-hundred SUTOSEN PCs, about seventeen virus-scan devices will be necessary. However, when trying to limit the number of virus-scan devices, the number of logical volumes that can be virus-scanned in a day decreases. As a result, the problem of reduced virus-scan (full-scan) execution frequency may arise.

Accordingly, it is an object of the present invention to provide a computer system and a virus-scan method that are capable of full-scanning a SUTOSEN PC logical volume at high frequency while limiting the number of virus-scan devices.

In order to solve the above-described problems, according to an aspect of the invention, a computer system includes a storage device storing data from a personal computer in a plurality of logical volumes arranged in memory areas of one or more hard disk drives, wherein the plurality of logical volumes comprises: a primary volume storing data from the personal computer; a snapshot volume storing the status of the primary volume at a given point in time; and a save destination volume storing an updated memory area within the primary volume as information about an updated block address reflected in a bitmap, the updated block address corresponding to a memory area within the primary volume; and wherein the computer system detects only an updated file in the primary volume from the snapshot volume and the save destination volume, creates an updated volume for storing a relevant updated file, and executes a virus-scan on the updated volume.

As a result of the above, a virus-scan target can be stored in an updated volume on an updated file basis, so that the amount of target data for performing the virus-scan can be significantly reduced.

Also, according to an aspect of the invention, a virus-scan method in a computer system that includes a storage device storing data from a personal computer in a plurality of logical volumes arranged in memory areas of one or more hard disk drives includes: a step of creating a primary volume storing data from the personal computer; a step of creating a snapshot volume storing the status of the primary volume at a given point in time; a step of creating a save destination volume storing an updated memory area within the primary volume as information about an updated block address reflected in a bitmap, the updated block address corresponding to a memory area within the primary volume; a step of detecting only an updated file in the primary volume from the snapshot volume and the save destination volume; a step of creating an updated volume for storing a relevant updated file; and a step of executing a virus-scan on the updated volume.

As a result of the above, a virus-scan target can be stored in an updated volume on an updated file basis, so that the amount of target data for performing the virus-scan can be significantly reduced.

According to the invention, it is possible to full-scan the logical volume of a SUTOSEN PC at high frequency while limiting the number of virus-scan devices.

Other aspects and advantages of the invention will be apparent from the following description and the appended claims.

BRIEF DESCRIPTION OF THE DRAWINGS

FIG. 6 is a chart showing a virus-scan execution management table according to an embodiment of the present invention.

FIG. 7 is a chart showing a PC table according to an embodiment of the present invention.

FIG. 8 is a chart showing an updated block management table according to an embodiment of the present invention.

DETAILED DESCRIPTION OF PREFERRED EMBODIMENTS

An embodiment of the present invention will be described below with reference to the attached drawings.

Figure 1:
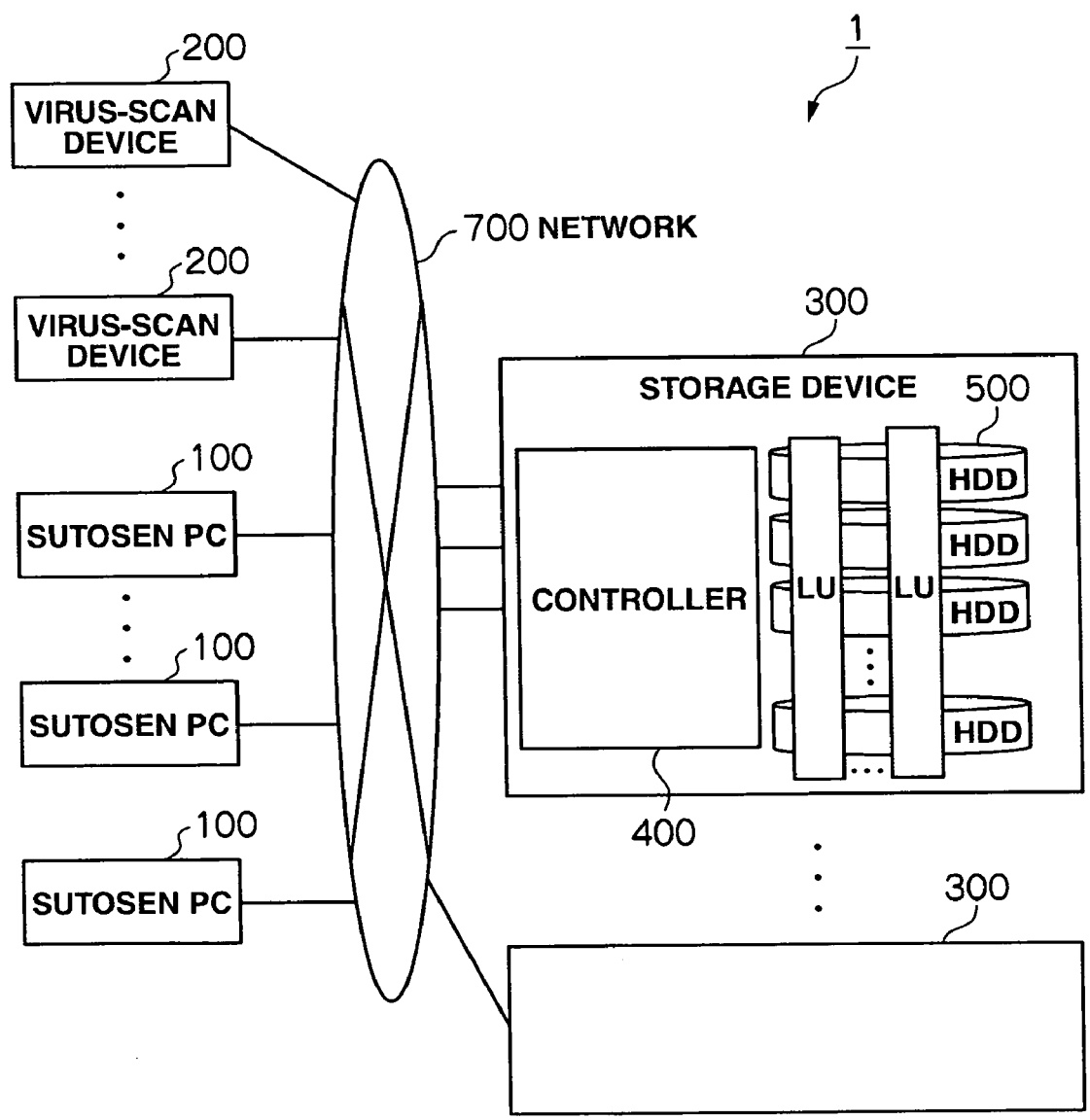
FIG. 1 is a block diagram showing the schematic configuration of a computer system according to an embodiment of the present invention.
Figure 2:
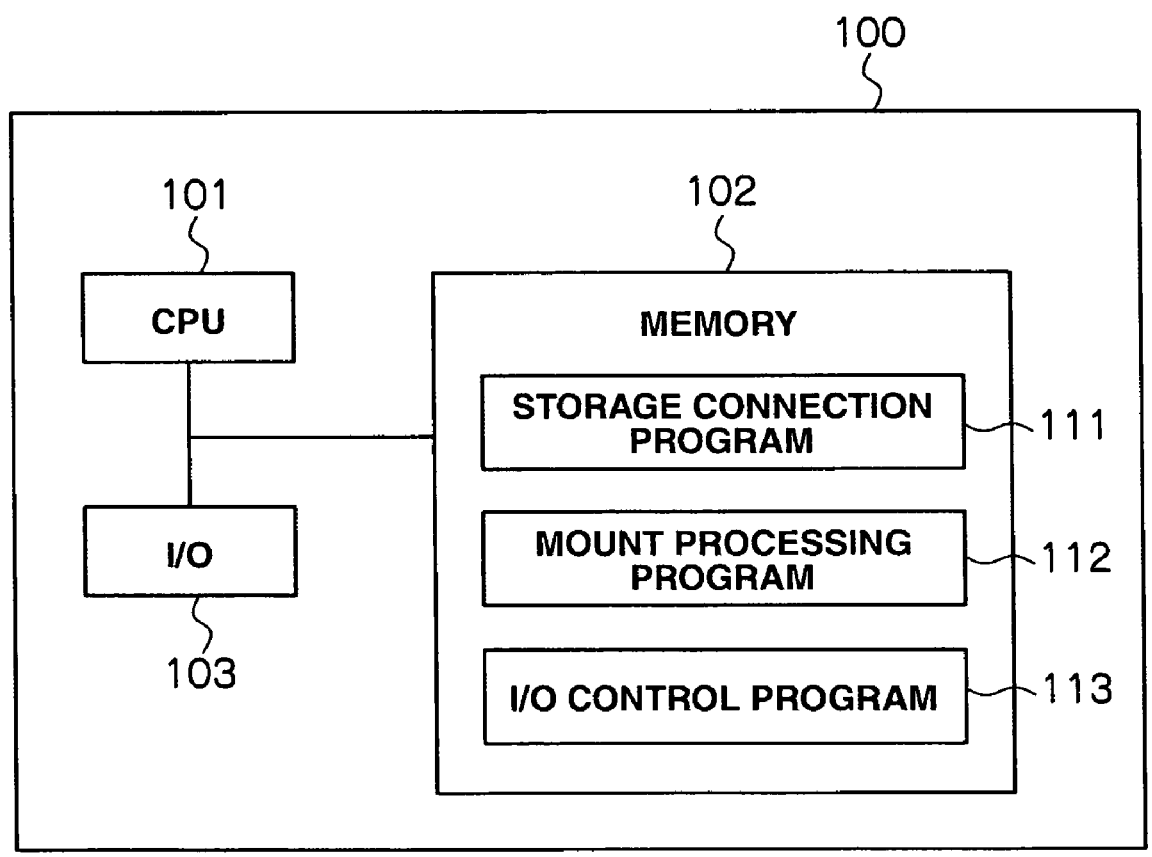
FIG. 2 is a conceptual diagram showing the internal configuration of a SUTOSEN PC according to an embodiment of the present invention.
Figure 3:
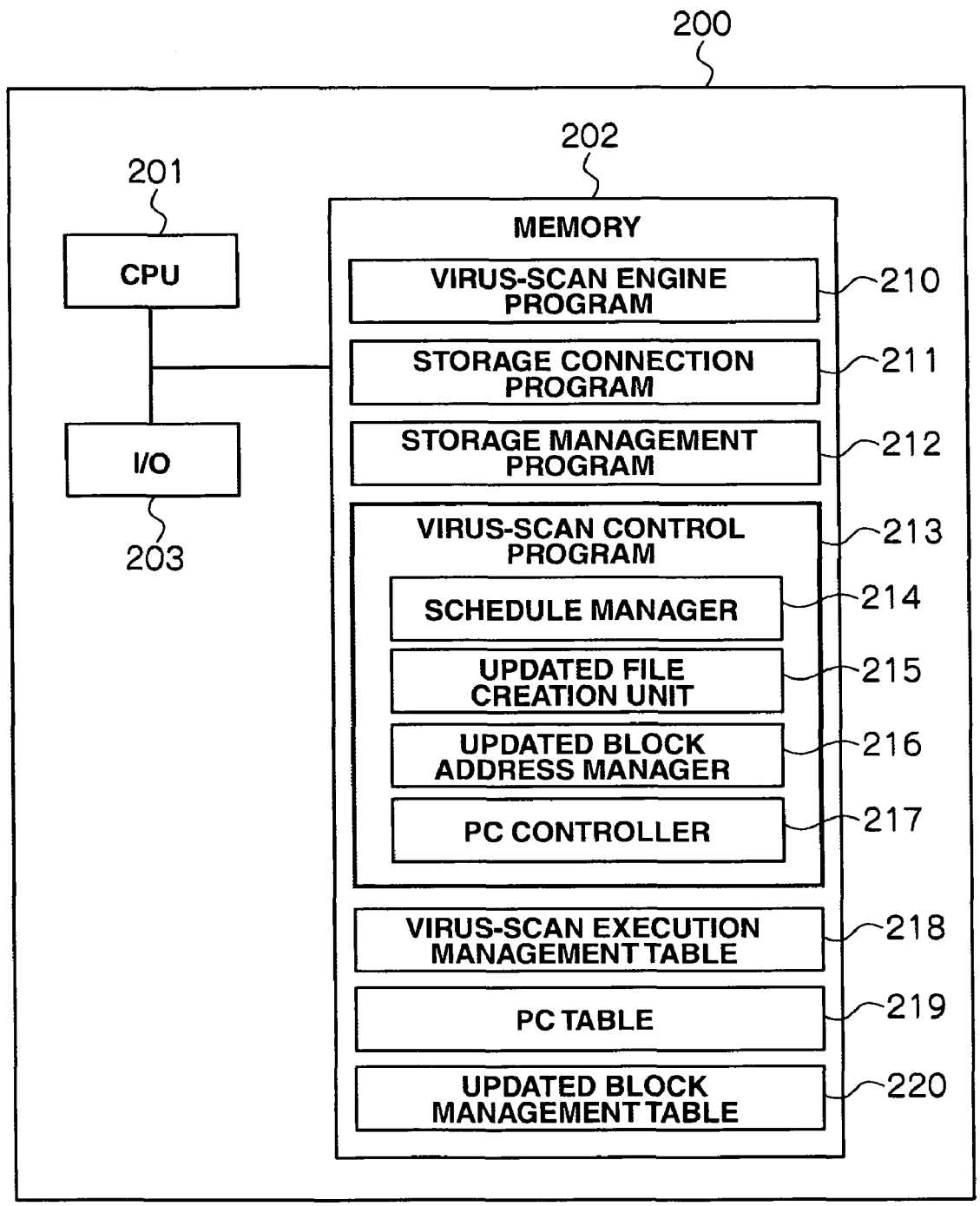
FIG. 3 is a conceptual diagram showing the internal configuration of a virus-scan device according to an embodiment of the present invention.
Figure 4:
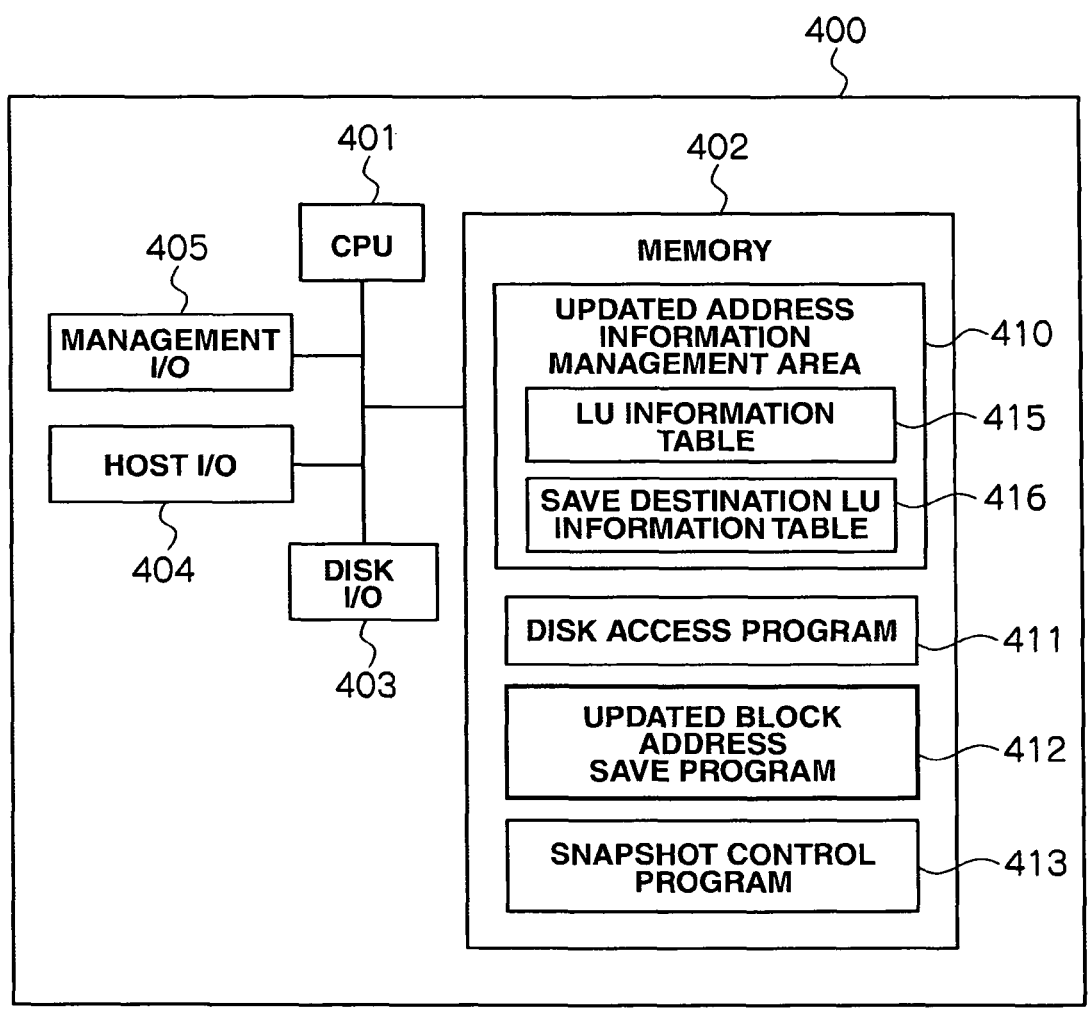
FIG. 4 is a conceptual diagram showing the internal configuration of a storage device according to an embodiment of the present invention.

(1) The Configuration According to the Embodiment (1-1) The Configuration of a System The schematic configuration of a computer system according to the embodiment will be described below with reference to FIGS. 1 to 4. FIG. 1 is a block diagram showing the schematic configuration of a computer system according to the embodiment. FIG. 2 is a conceptual diagram showing the internal configuration of a SUTOSEN PC according to the embodiment. FIG. 3 is a conceptual diagram showing the internal configuration of a virus-scan device according to the embodiment. And, FIG. 4 is a conceptual diagram showing the internal configuration of a storage device according to the embodiment.

As shown in FIG. 1, "1" indicates a computer system according to the embodiment. The computer system 1 includes a SUTOSEN PC 100 used by a user, a virus-scan device 200 performing virus-scan processing, and a storage device 300 equipped with a logical volume LU used by the user. The SUTOSEN PC 100, the virus-scan device 200 and the storage device 300 are interconnected via an IP network 700.

The IP network 700 is a local area network (LAN) established with Ethernet (registered trademark), and data transmission is performed using TCP/UDP/IP protocols as communication protocols. In the embodiment, an iSCSI protocol is used during communication between the SUTOSEN PC 100 and the storage device 300. Also, FC protocol may be used during communication between the SUTOSEN PC 100 and the storage device 300. When using FC protocol, the SUTOSEN PC 100 and the storage device 300 are connected via an FC network.

(1-2) The Configuration of a SUTOSEN PC

The SUTOSEN PC includes, as shown in FIG. 2, in the interior, a CPU 101, memory 102 and an I/O interface 103. The CPU 101, memory 102 and I/O interface 103 are interconnected via a bus 104. The CPU 101 is a processor unit for executing various programs stored in the memory 102. The memory 102 is a so-called internal memory device including both non-volatile memory for storing various programs, etc. and volatile memory for temporarily storing a processing result. The I/O interface 103 connects to the storage device 300 or virus-scan device 200 via the IP network 700.

In the memory 102, a storage connection program 111—a driver—for connecting to the storage device 300, a mount processing program 112 and an I/O control program 113 are stored.

The mount processing program 112 is a program for mounting the logical volume LU of the storage device 300 in the SUTOSEN PC 100; allowing an OS recognize the logical volume LU as the hard disk drive of the SUTOSEN PC 100; and sending I/O requests directed to the hard disk drive to the logical volume LU of the storage device 300.

The I/O control program is a program related to the present method, and it is a program for controlling suspension, resumption and cancellation of I/O requests directed to the hard disk drive 500.

(1-3) The Configuration of a Virus-Scan Device

The virus-scan device 200 includes, as shown in FIG. 3, in the interior, a CPU 201, memory 202 and an I/O interface 203. The CPU 201, the memory 202 and the I/O interface 203 are interconnected via a bus 204. The CPU 201 is a processor unit for executing various programs stored in the memory 202. The memory 202 is a so-called internal memory device including both non-volatile memory for storing various programs, etc. and volatile memory for temporarily storing a processing result. The I/O interface 203 connects to the I/O interface 103 of the SUTOSEN PC 100, a host I/O interface 404 of the storage device 300 and a management I/O interface 405 via the IP network 700.

In the memory 202, a virus-scan engine program 210, a storage connection program 211, a storage management program 212, a virus-scan control program 213, an execution management table 218, a PC table 219 and an updated block management table 220 are stored.

The virus-scan engine program is a program for executing a virus-scan on a designated logical volume LU and a designated file, and for reporting to the SUTOSEN PC 100 whether or not they are infected by a virus, as the virus-scan execution result.

The storage connection program is a program for the virus-scan device 200 to connect to the host I/O interface 404 of the storage device 300, and to perform a snapshot creation command and an I/O request to a logical volume LU.

The storage management program 212 is a program for the virus-scan device 200 to connect to the management I/O interface 405; to send a command to an updated block address save program 412 (described below); and to copy information on an updated address information management area to a logical volume LU.

The virus-scan control program 213 is a program for executing virus-scan processing according to the present method, and it has a function that executes the virus-scan processing in a schedule manager 214, an updated file creation unit 215, an updated block address manager 216 and a PC controller 217 (described below). Detailed descriptions of the virus-scan control program 213 and the tables 218 to 220 will be described below.

(1-4) The Configuration of a Storage Device

The storage device 300 includes a controller 400 and a plurality of magnetic hard disk drives 500 (abbreviated to "HDD" in the drawings). The storage device 300 is a disk array device having a RAID (Redundant Array of Independent/Inexpensive Disks) configuration with a plurality of magnetic hard disks, and provides one or a plurality of logical volumes LU.

The controller 400 of the storage device 300 includes, as shown in FIG. 4, in the interior, a CPU 401, memory 402, a disk I/O interface 403, a host I/O interface 404 and a management I/O interface 405. The CPU 401, the memory 402, the disk I/O interface 403, the host I/O interface 404 and the management I/O interface 405 are interconnected via a bus 406.

The CPU 401 is a processor unit for executing various programs stored in the memory 402. The memory 202 is a so-called internal memory device including both non-volatile memory for storing various programs, etc. and volatile memory for temporally storing a processing result. The disk I/O interface 403 connects to the magnetic hard disk drive 500. The host I/O interface 404 connects to the SUTOSEN PC 100 and the virus-scan device 200 via the IP network 700. The management I/O interface 405 connects to the virus-scan device 200 via the IP network 700.

In the memory 402, an updated address information management area 410, a disk access program 411, an updated block address save program 412 and a snapshot control program 413 are stored.

The updated address information management area 410 is an area for storing a logical volume information table 415 (abbreviated to "LU information table" in the drawings) managing an updated block address based on a write request from the SUTOSEN PC 100, and save destination volume information 416 (abbreviated to "save destination LU information table" in the drawings) managing an updated block address with each logical volume LU.

A block address BA described herein is an address for which the updated or to-be-updated status in the logical volume LU is reflected in a difference bitmap BM, so the memory area of the logical volume LU is represented by the block address BA in the difference bitmap BM. For example, when data stored in a given address in a logical volume LU is updated in accordance with a given write request from the SUTOSEN PC 100, the updated block address information is managed so that a flag appears in the block address BA#1, which corresponds to the given address, in the difference bitmap BM. Thus, in the storage device 300, when data in the logical volume LU is updated, "1" is stored in the block address BA on the difference bitmap BM; and when the data is to-be-updated, "0" is stored in the block address BA on the difference bitmap BM; and in this way, the difference bitmap BM is managed. The detailed descriptions of the logical volume information table 415 and the save destination information table 416 will be described below.

The disk access program 411 is a program for, after receiving a read-write command issued from the SUTOSEN PC 100 to the logical volume from the host I/O interface 404, executing the read-write command using the disk I/O interface 403. Also, it records an updated block address in the updated address information management area 410 reserved in memory.

The updated block address save program 412 is a program related to the present method, and it is a program for receiving an updated block information save command from the management I/O interface 405, and copying information stored in the updated address information management area 410 to a save destination volume ULU.

The snapshot control program 413 receives a snapshot creation command issued for a logical volume LU from the host I/O interface 404, and creates a snapshot volume SLU.

The detailed descriptions of the save destination volume ULU and the snapshot volume SLU will be given below.

(1-5) The Configuration of a Logical Volume

Figure 5:
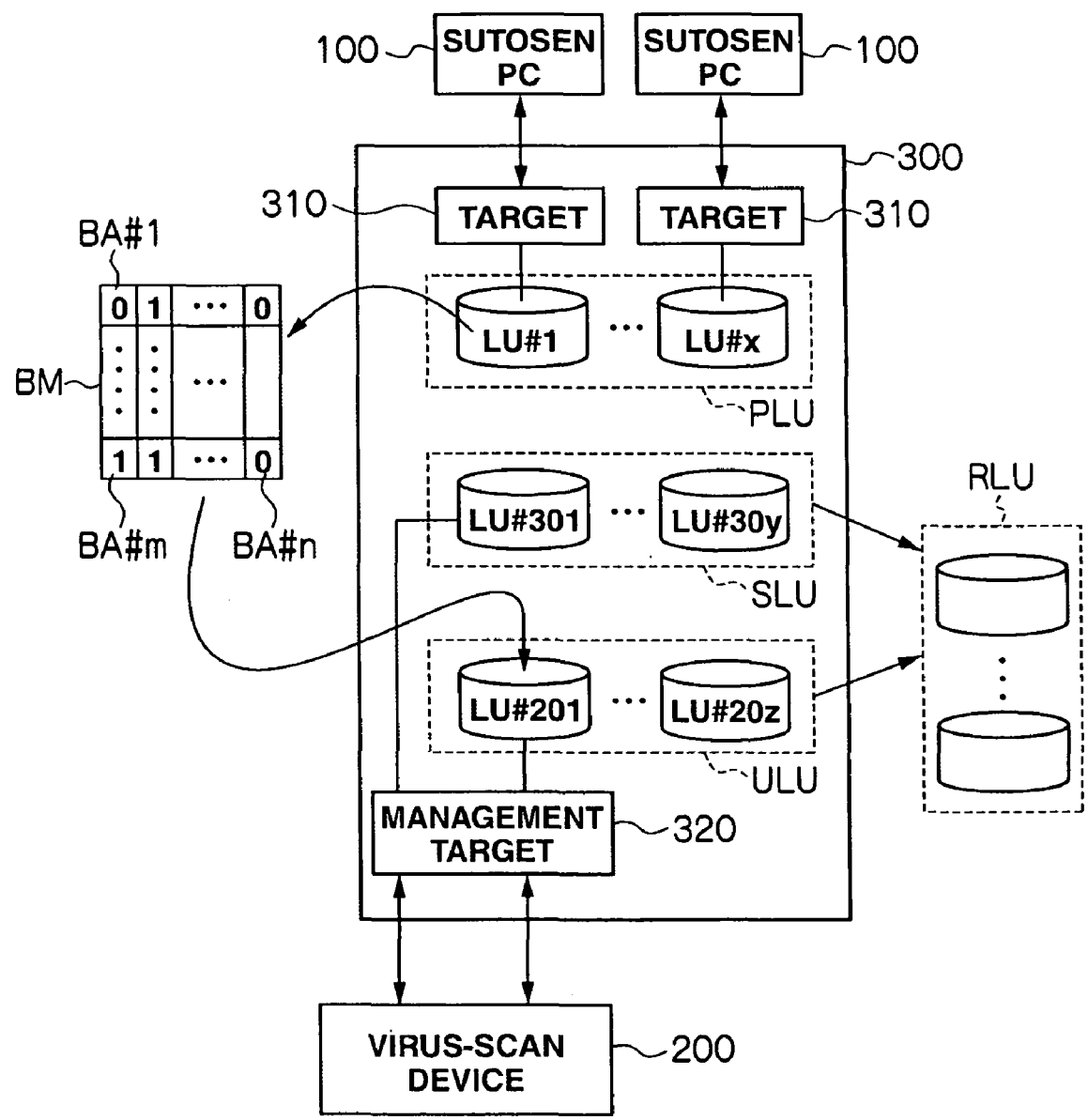
FIG. 5 is an explanatory diagram conceptually showing the configuration of a logical volume created by a storage device according to an embodiment of the present invention.

Next, the configuration of a logical volume according to the embodiment will be described below with reference to FIG. 5.

The storage connection program 111 of the SUTOSEN PC 100 or the storage connection program 211 of the virus-scan device 200 connects to the storage device 300 using identification information which is referred to as a target 310 or a management target 320 (hereinafter referred to as "target information"). Target information, when using an iSCSI, means identification information identifying an IP address and a logical volume that identify the port (not shown) of the host I/O interface 404. Also, target information may include information on an initiator name.

One or more logical volumes LU are mapped on the target 310 or the management target 320.

For example, if the SUTOSEN PC 100 connects to the target 310 of the storage device 300, the logical volume LU mapped to the target 310 is mounted in the SUTOSEN PC 100.

Also, the virus-scan device 200 connects to the target 320 of the storage device 300, and a primary volume PLU, the save destination volume ULU and the snapshot volume SLU are mapped to the management target 320, so that data can be input and output to/from these logical volumes LU.

In the present system 1, each SUTOSEN PC 100 has at least one logical volume LU for storing data from the SUTOSEN PC 100, and that logical volume LU is referred to as primary volume PLU.

Also in the present system 1, each primary volume PLU has a logical volume LU for storing information on a block address BA on a difference bitmap BM. Updated block address information in the difference bitmap BM is saved in the other logical volume LU, the updated block address is synchronized with the updates in the primary volume PLU, and the logical volume LU for storing the aforementioned information is referred to as a save destination volume ULU. Note that update information on the storing area of a plurality of primary volumes PLU may be stored in one save destination volume ULU.

Furthermore, in the present system 1, each primary volume PLU has a logical volume LU for storing the status of the primary volume PLU at a given point in time, and that logical volume LU is referred to as snapshot volume SLU.

(2) The Configurations of Programs and Tables (2-1) The Configuration of a Virus-Scan Program and Respective Tables in the Virus-Scan Device A characteristic feature according to the present system 1 is that an updated volume RLU stores only updated data on a file-by-file basis, the file is created from the save destination volume ULU and snapshot volume SLU; and thereby a virus-scan is executed for the aforementioned update volume RLU.

To accomplish the above characteristic feature, first, the configuration of a virus-scan control program 213 and tables 218 to 210 will be described. The virus-scan control program 213 includes a function to be performed in a schedule manager 214, an updated file creation unit 215, an updated block address manager 216 and a PC controller 217. The virus-scan control program 213 is a program executed by the CPU 101 at all times.

In the schedule manager 214, the CPU 101 refers to the virus-scan execution management table 218, and starts a virus-scan for a logical volume LU using the updated block address manager 216 and PC controller 217.

The virus-scan execution management table 218 is, as shown in FIG. 6, a table for managing the result of a virus-scan executed on each primary volume PLU. Furthermore, the virus-scan execution management table 218 includes, an "LU number" column 218A representing the number of a primary volume PLU that is to be a target for executing a virus-scan; an "execution frequency" column 218B representing the frequency of virus-scan execution; an "execution date" column 218C representing a date when a virus-scan is executed; an "actual used volume" column 218D representing, of the memory areas within a target primary volume PLU, a memory area that actually stores data; an "updated block volume" column 218E representing, of the memory areas actually storing data, a memory area whose data is updated; and an "execution time" column 218F representing a time when a virus-scan is executed.

The virus-scan execution management table 218 shows the results such as, a logical volume LU for which a virus-scan is to be executed, and the frequency of virus-scan execution for each logical volume LU (for example, once a day, etc.), etc.

In the PC controller 217, the CPU 101 refers to the PC table 219, and when executing a virus-scan, controls data input and output to/from the hard disk drive 500 at the SUTOSEN PC 100 end.

The PC table 219 is, as shown in FIG. 7, a table for managing the SUTOSEN PC 100 that uses the primary volume PLU, and it includes, an "LU number" column 219A representing the number of a primary volume PLU a particular SUTOSEN PC 100 uses; and a "PC address" column 219B representing the address of a SUTOSEN PC 100 that uses the primary volume PLU.

The SUTOSEN PC 100 that uses the primary volume PLU can be identified from the PC table 219.

In the updated block address manager 216, the CPU 101 refers to the updated block management table 220, and copies information on an updated block address BA within a logical volume LU to a save destination volume ULU.

The updated block management table 220 is, as shown in FIG. 8, a table for managing information on an updated block address BA within a primary volume PLU, and it is created based on the save destination volume information table 416 described below.

Furthermore, the updated block management table 220 includes, an "LU number" column 220A representing the number of a primary volume PLU storing updated data; an "updated block size" column 220B representing the size of each piece of updated data in the primary volume PLU managed by a block-by-block on a difference bitmap BM basis; a "save destination LU" column 220C representing the number of save destination volumes ULU storing information on an updated block address BA; a "generation number" column 220D representing an update count; a "stored number" column 220E representing how many pieces of updated block address information is stored in the save destination volume information table 416; a "stored array number" column 220F representing the array number of the save destination volume information table 416 storing the latest information on an updated block address BA; and a "latest save date" column 220G representing a date when the last time an updated block address information was stored in a save destination volume ULU.

A copy destination (a save destination) for an updated block address can be identified from the updated block management table 220.

In the updated file creation unit 215, the CPU 101 refers to updated block address information in a save destination volume ULU and a snapshot volume SLU, and creates an updated volume RLU that includes updated files only.

(2-2) The Configuration of Various Tables in a Storage Device

Next, a volume information table 415 and a save destination volume that are located within an updated address information management area 410 in the storage device 300 will be described below.

Figure 9:
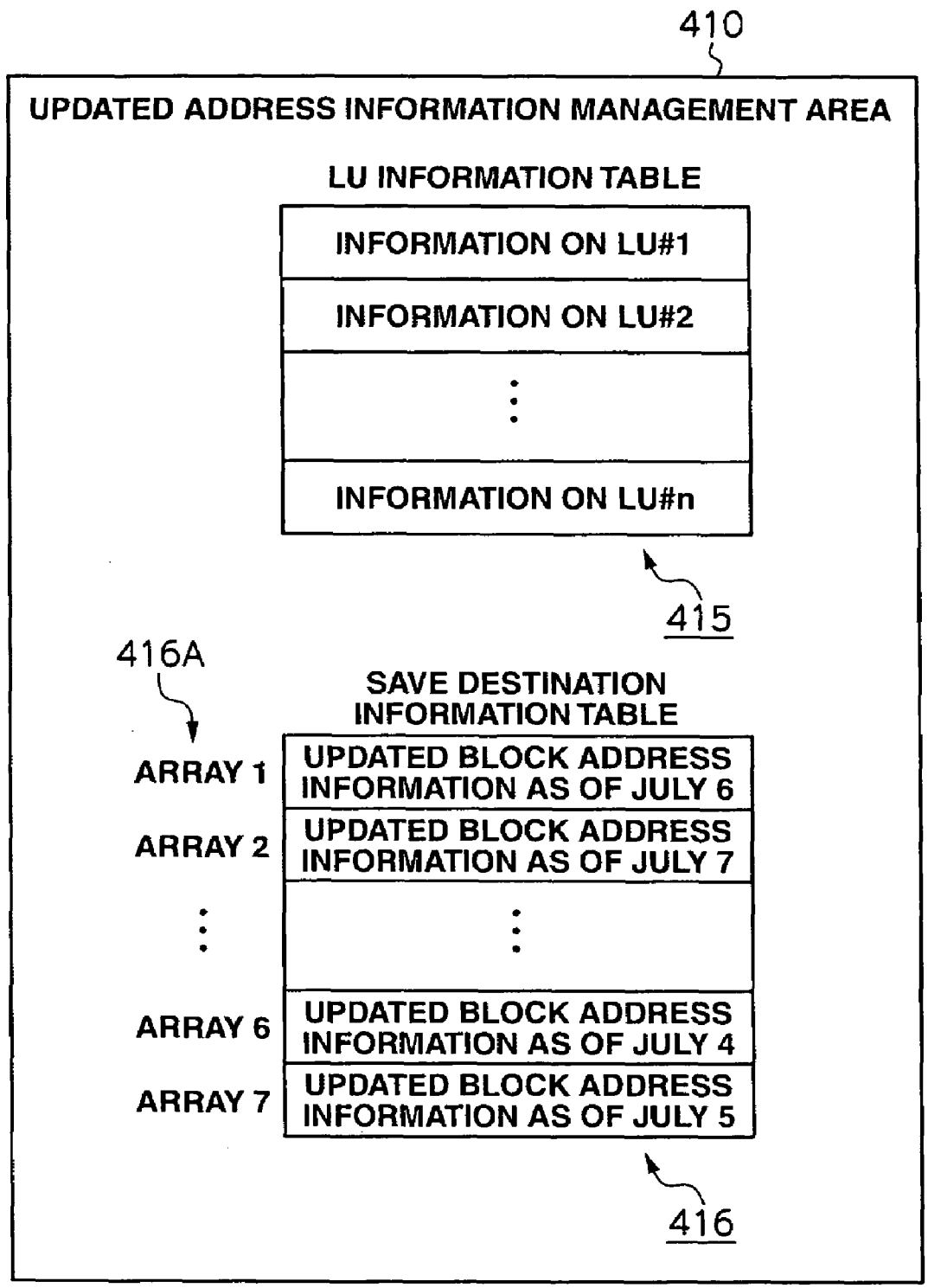
FIG. 9 is an explanatory diagram showing an updated address information management area according to an embodiment of the present invention.

The volume information table 415 is, as shown in FIG. 9, a table for managing volume information on each primary volume PLU, and it manages information on updated block addresses BA within all primary volumes PLU.

The save destination volume information table 416 is a table for managing the detailed volume information on respective primary volumes PLU that are stored in the volume information table 416, so the same number of save destination volume information tables 416 exist as there are primary volumes PLU. For example, FIG. 9 shows the save destination volume information table 416 for a primary volume PLU#1 to which the number "1" is assigned. In each storing, an array number is assigned to the save destination volume information table 416 for a primary volume PLU#1, and information on block addresses updated daily is stored in the save destination volume information table 416 for seven days. A stored array section 416A in the save destination volume information table 416 is divided by each execution frequency determined in the "execution frequency" column 218B in the virus-scan execution management table 218. In this example, the frequency is determined in the "execution frequency" column 218B so that a virus-scan is executed once a day, so the number of the stored array section is "7". The updated block address information is stored for generation numbers in a save destination volume ULU, so that, when executing a virus-scan, a block updated a week before can always be a target for a virus-scan. The save destination volume information table 416 can manage a plurality of updated block address information in the past.

In the updated address information management area 410, updated block address information on a designated primary volume PLU is stored in accordance with an "updated block information record start command" from the virus-scan device 200. The memory areas of the designated primary volume PLU are all cleared with "0" (initialized) in accordance with the "updated block information record start command" from the virus-scan device 200; however, after this, if the LBA (Logical Block Address) of any primary volume PLU is "write," a bit corresponding to the LBA of the aforementioned primary volume PLU changes to "ON" ("1"), and a block that does not have "write" remains as "OFF" ("0").

(3) Virus-Scan Processing (3-1) Initial Setting Processing

In the computer system 1 having the above-described configuration, the steps in which an administrator initiates virus-scan processing will be described below.

First, a CPU 401 of the storage device 300 creates a primary volume PLU and a target 310 for the SUTOSEN PC 100, and maps the primary volume PLU to the target 310. Next, the CPU 401 of the storage device 300 finds the volume size of a save destination volume ULU by multiplying a block size by a generation number, and creates a save destination volume ULU with the found volume size. In the present embodiment, a save destination volume ULU will be created and assigned to each primary volume PLU.

For example, assume that the generation number of information on an updated block address that is to be saved in a save destination volume ULU is seven. The updated block size is equivalent to the size of the memory area the CPU 401 uses for managing information on an updated block address BA within one primary volume PLU in accordance with a disk access program. The size of the memory area can be calculated from the total number in blocks of primary volume PLU, the least number of blocks for which the disk access program 411 can manage updates, and the size of the area in which the least number of blocks is stored.

Also, the CPU 401 of the storage device 300 determines the volume number of a snapshot volume SLU from all logical volumes LU, and creates a snapshot volume SLU in the storage device 300.

An administrator specifies identification information (namely, a target IP address, a target name and an initiator name), with which the SUTOSEN PC 100 connects to a primary volume PLU, in a storage connection program 111.

The administrator initiates a virus-scan on an updated volume RLU storing files containing update address information only.

Next, the administrator activates the virus-scan program 213, and provides the virus-scan program 213 with the values of: the number of the primary volume PLU to be virus-scanned; the frequency of virus-scan execution; the size of update block; the number of the save destination volume ULU; a generation number; and the address of the SUTOSEN PC 100 using the primary volume PLU. The CPU 201 of the virus-scan device 200 assigns these values to corresponding columns in the virus-scan execution table 218, the PC table 219 and the updated block management table 220, and then initiates a virus-scan service.

(3-2) Virus-Scan Processing

After the administrator has completed the initial settings, the virus-scan starts. The virus-scan processing is executed by means of activating all programs in each CPU 101, 201 and 401.

Figure 10:
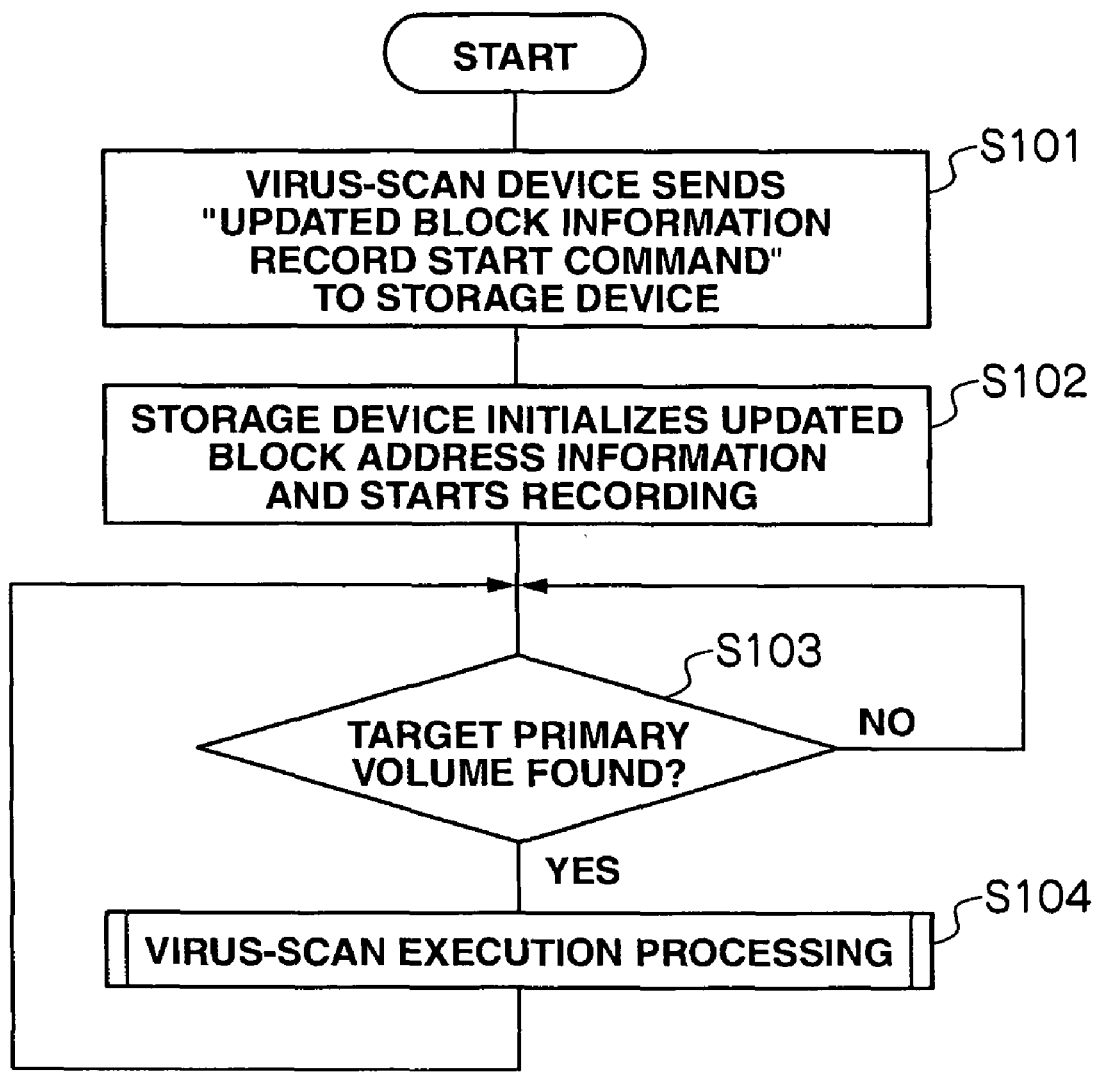
FIG. 10 is a flowchart illustrating virus-scan processing according to an embodiment of the present invention.
Figure 11:
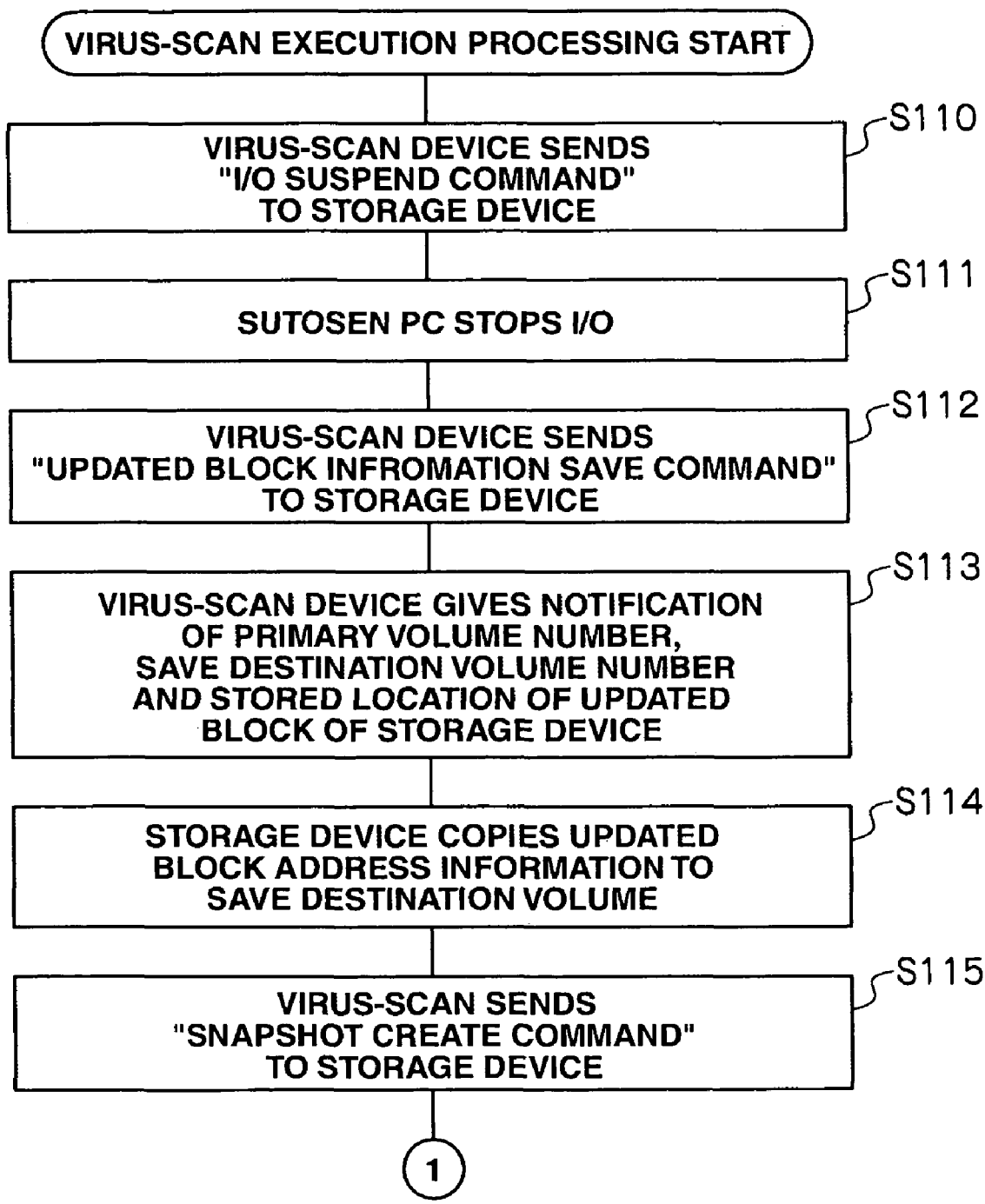
FIG. 11 is a flowchart illustrating entire virus-scan execution processing according to an embodiment of the present invention.
Figure 12:
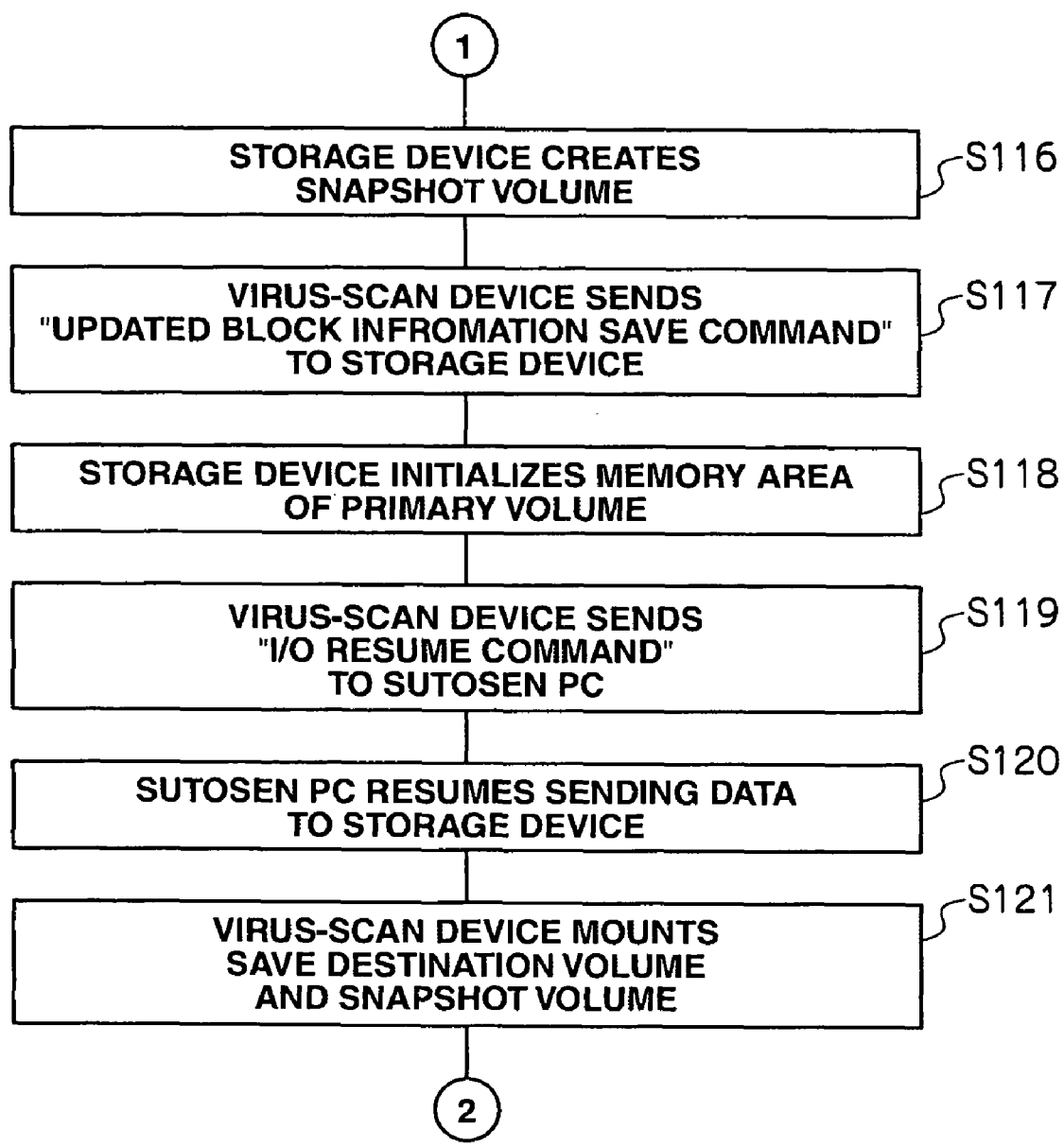
FIG. 12 is a flowchart illustrating virus-scan execution processing according to an embodiment of the present invention.
Figure 13:
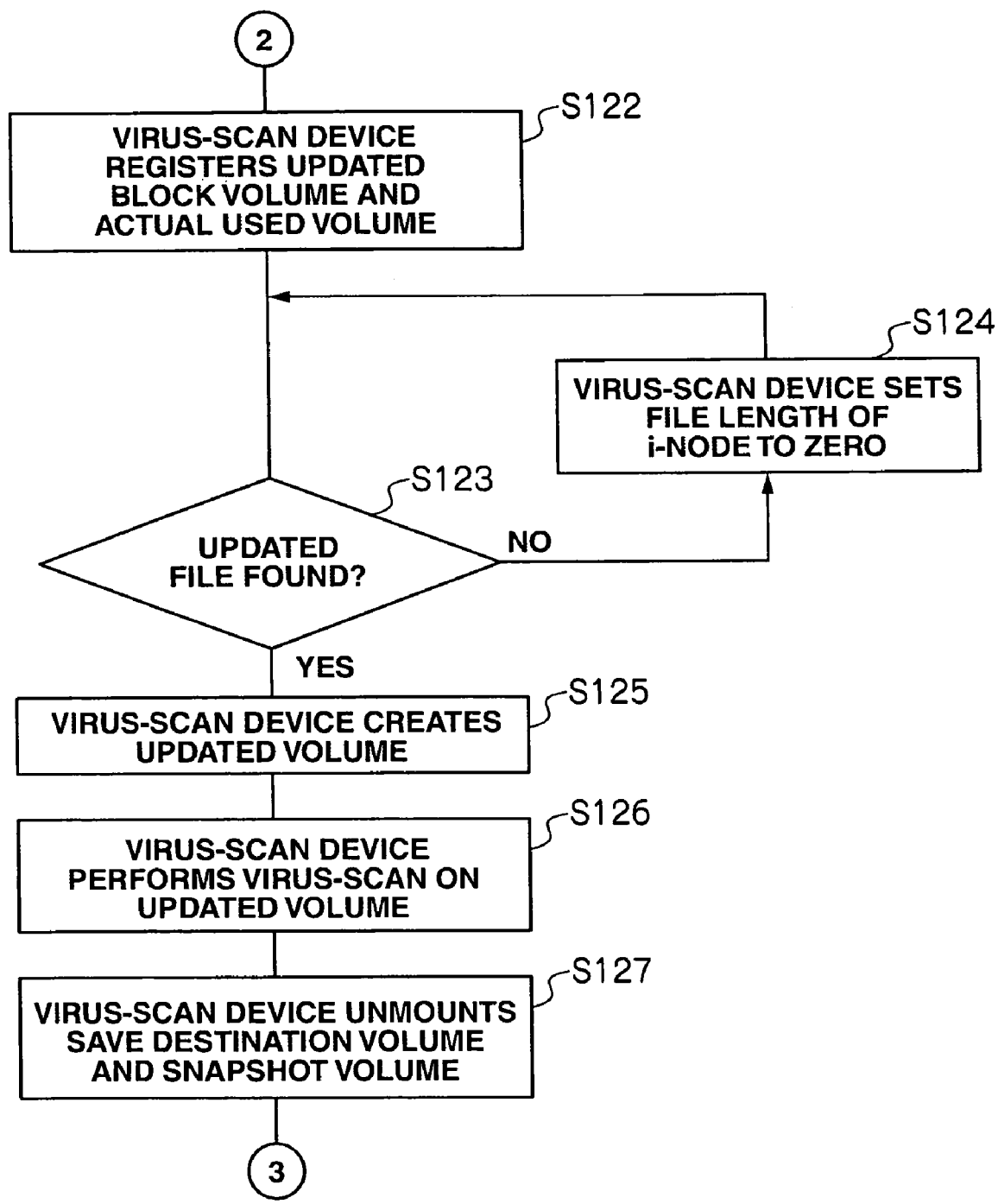
FIG. 13 is a flowchart illustrating virus-scan execution processing according to an embodiment of the present invention.
Figure 14:
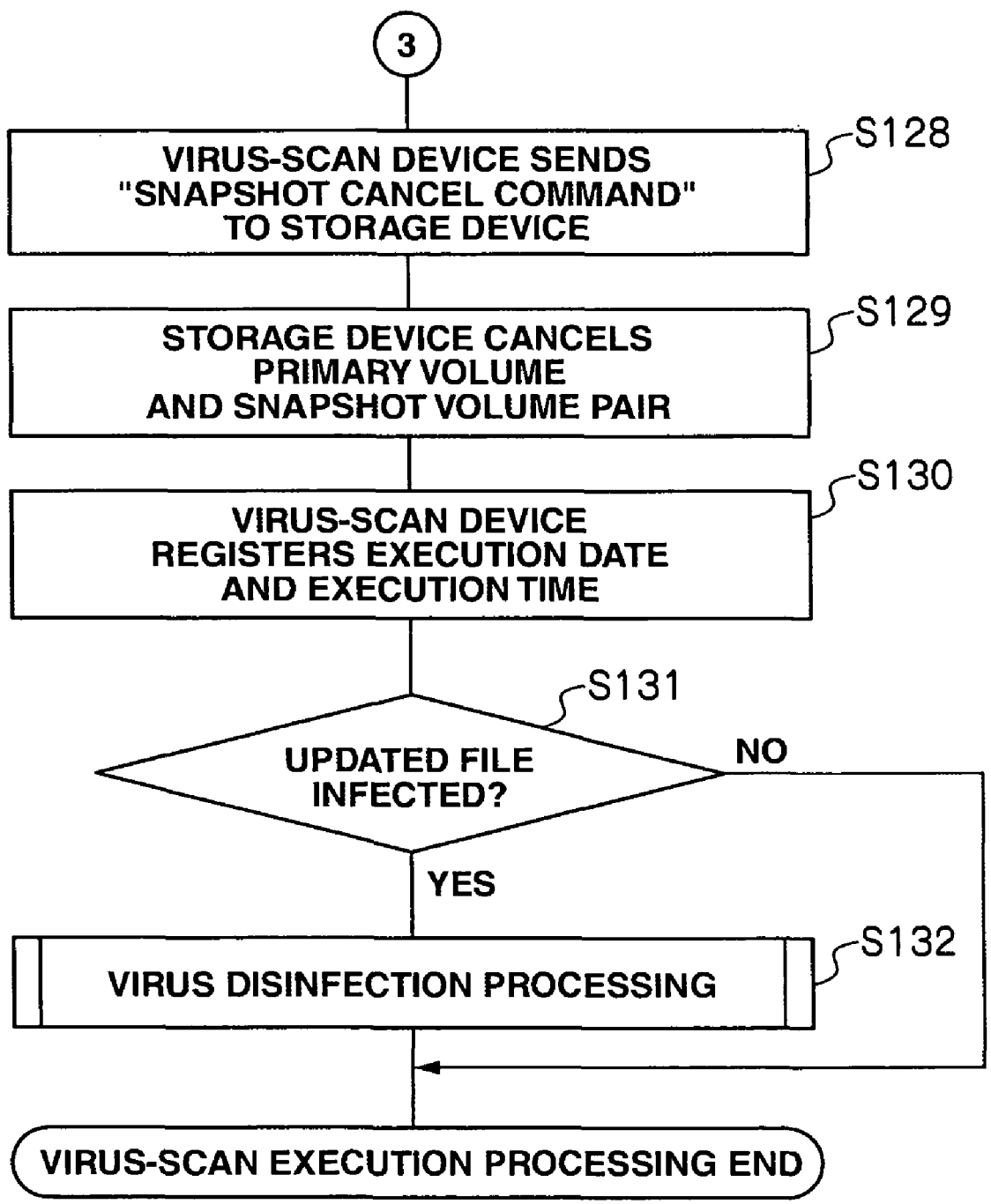
FIG. 14 is a flowchart illustrating virus-scan execution processing according to an embodiment of the present invention.
Figure 15:
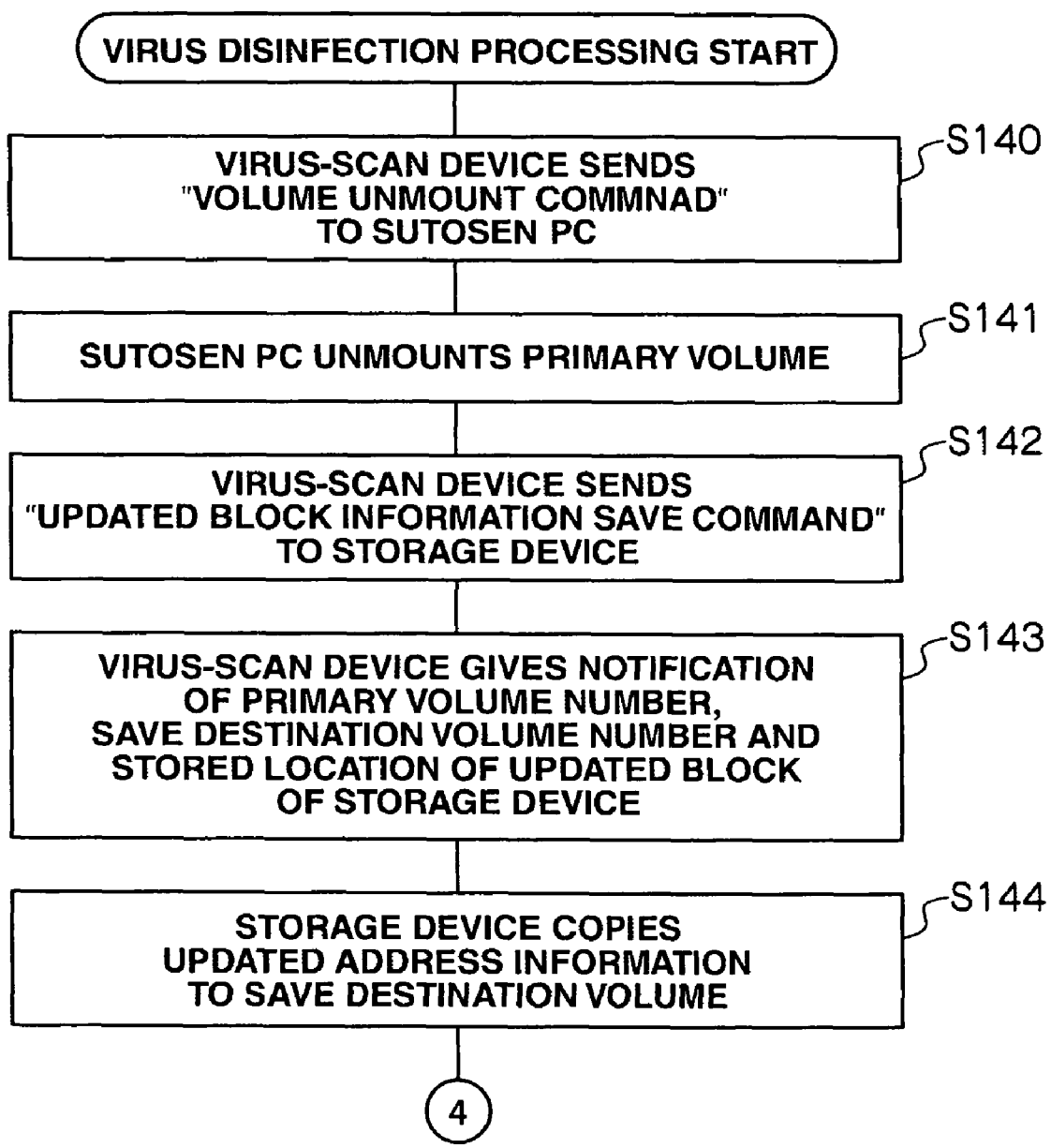
FIG. 15 is a flowchart illustrating virus disinfection processing according to an embodiment of the present invention.
Figure 16:
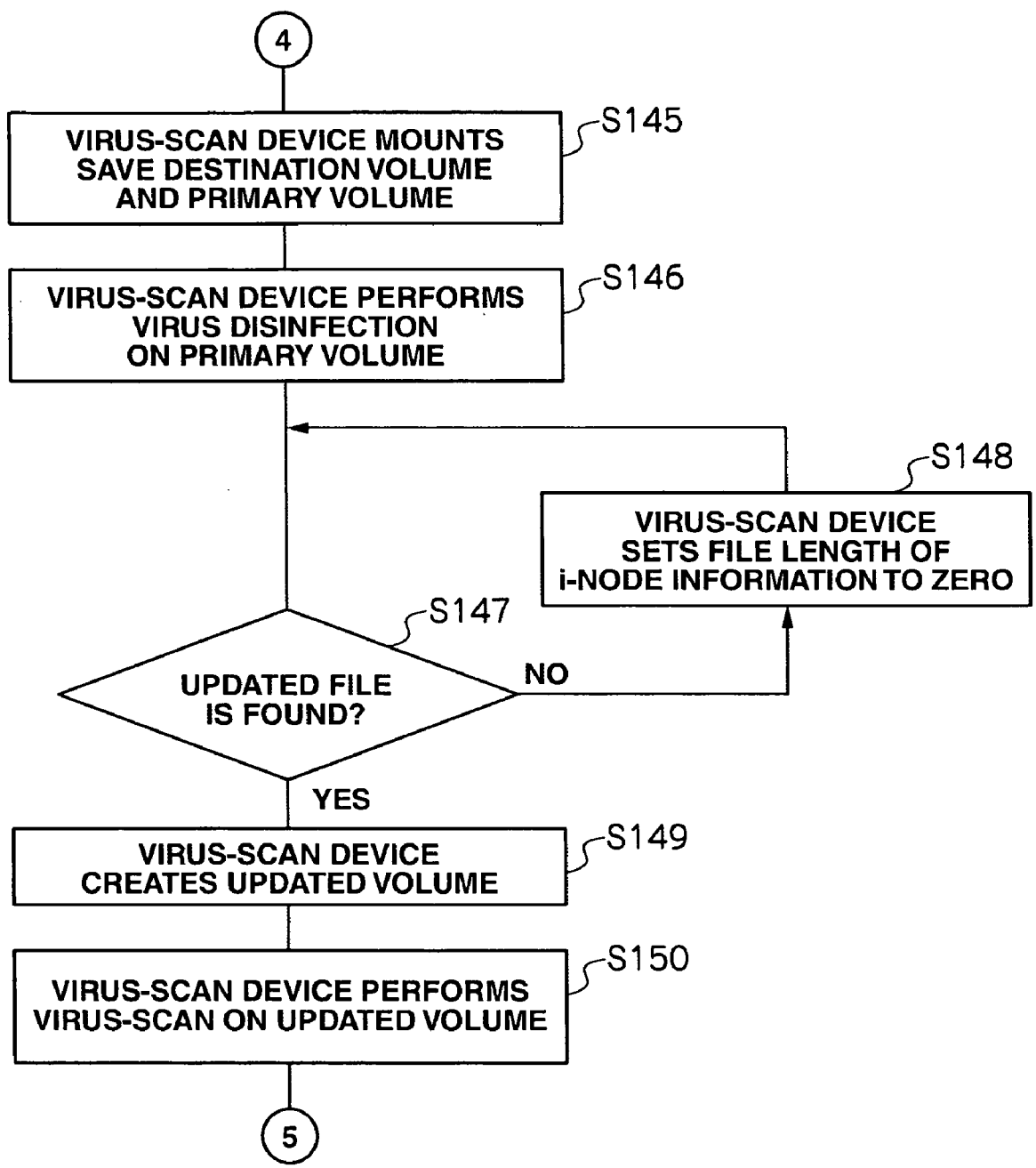
FIG. 16 is a flowchart illustrating virus disinfection processing according to an embodiment of the present invention.
Figure 17:
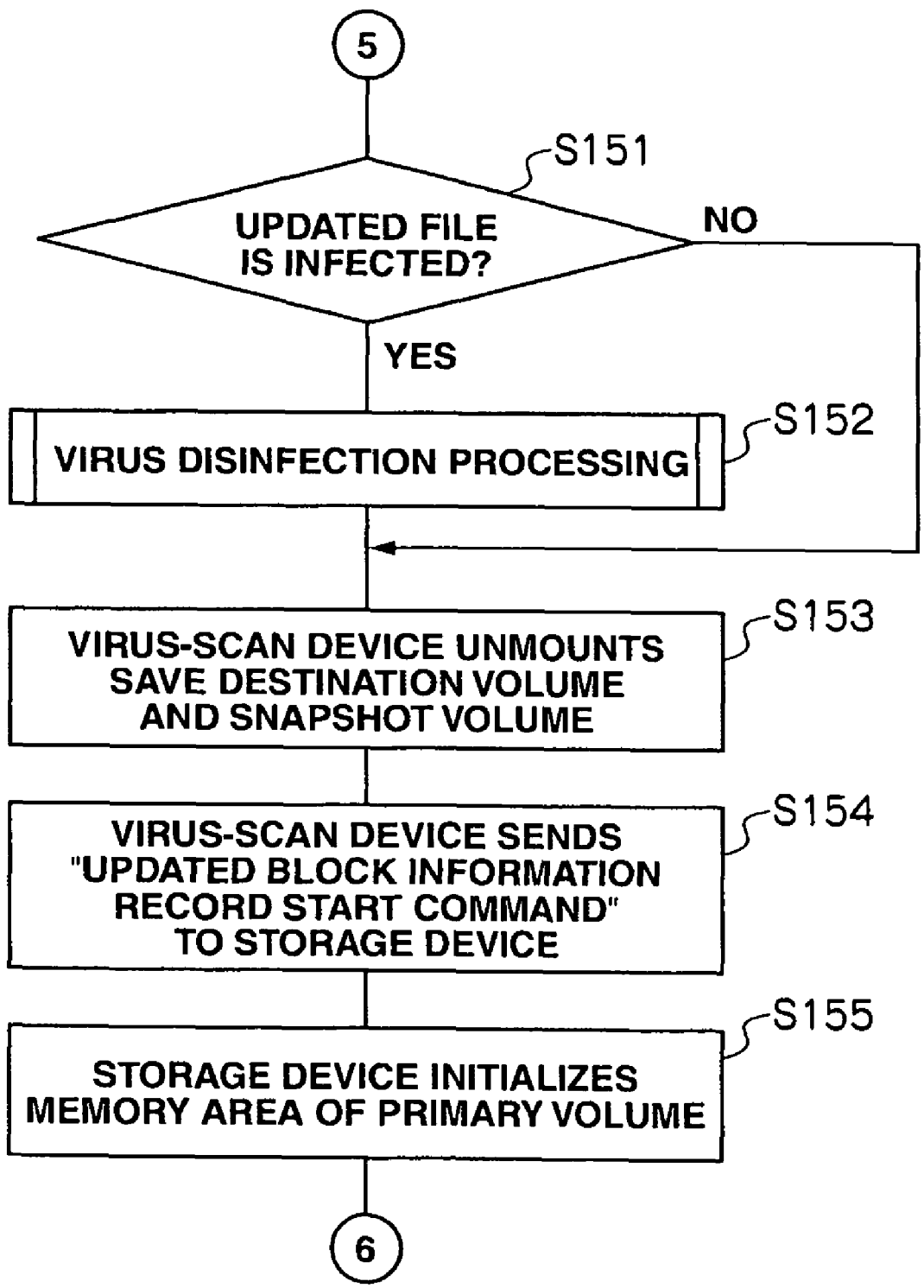
FIG. 17 is a flowchart illustrating virus disinfection processing according to an embodiment of the present invention.
Figure 18:
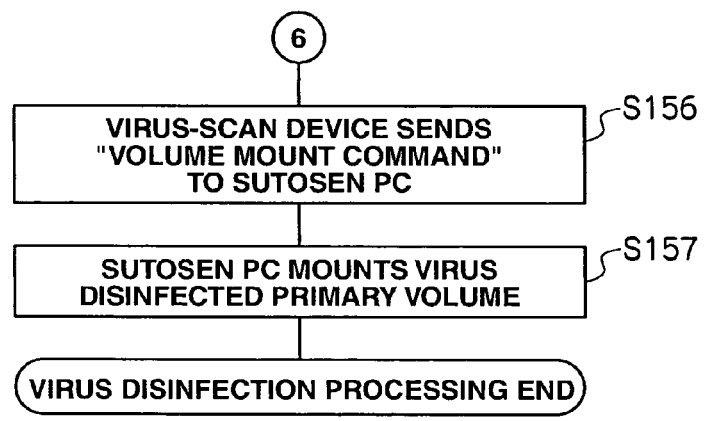
FIG. 18 is a flowchart illustrating virus disinfection processing according to an embodiment of the present invention.

As shown in FIG. 10, specifically, the virus-scan starts based on the execution date and execution frequency specified in the virus-scan execution table 218.

First, when the CPU 201 of the virus-scan device 200 activates the virus-scan control program 213, the CPU 201 specifies the number of the primary volume PLU registered in the virus-scan execution management table 218, and sends an "updated block information record start command" to the disk access program 411 of the storage device 200, by means of the updated block address manager 216 via the schedule manager 214 (S101).

When the CPU 401 of the storage device 300 receives the updated block information record start command, the CPU 401 activates the disk access program 411, initializes an updated address management area 410, and starts recording information on a block address to be updated (S102).

The CPU 201 of the virus-scan device 200 refers to an execution date and an execution frequency in the virus-scan execution table 218, and searches for a primary volume PLU to be virus-scanned (S103). If there is a target (S103: YES), the CPU 201 of the virus-scan device 200 continues to perform the virus-scan processing (S104), then after completing the virus-scan processing, returns again to step S103.

Note that, if there is no primary volume PLU that is a target for virus-scanning (S103: NO), the CPU 201 of the virus-scan device 200 repeats step S103 until it detects a primary volume PLU that is a target for virus-scanning.

(3-3) Virus-Scan Execution Processing

Next, virus-scan execution processing will be described below.

As shown in FIGS. 11 to 14, the CPU 201 of the virus-scan device 200 sends an "I/O stop command" to the SUTOSEN PC 100 by using a PC controller 217 via a schedule manager 214 (S110).

When the SUTOSEN PC 100 receives the "I/O stop command," it sends write block data, which is suspended in the cache memory (not shown) within the SUTOSEN PC 100, to the primary volume PLU of the storage device 300 based on an I/O control program 113, and then the SUTOSEN PC 100 stops sending write block data to the storage device 300 (S111).

The CPU 201 of the virus-scan device 200 sends an "updated block information save command" to the storage device 300 by using an updated block address manager 216 via a schedule manager 214 (S112). Then, the CPU 201 of the virus-scan device 200 locates the stored location of an updated block in a bitmap, where the updated block corresponds to updated data, from the values of an updated block size and a stored array number that are determined in an updated block management table 220; and reports the number of the primary volume PLU connecting to the SUTOSEN PC 100, the number of the save destination ULU and the stored location of the updated block to the storage device 300 (S113).

When the CPU 401 of the storage device 300 receives the "updated block information save command," it activates an updated block address save program 412, and copies updated block address information on the designated primary volume PLU to the designated save destination volume ULU (S114). Thus, the CPU 401 of the storage device 300 updates the stored number and the stored array number in an updated block address management table 220, and then determines the last save date, by using the updated block address manager 216.

For example, when the latest information on an updated block address is stored in the array 3 in the stored array section 416A in the save destination volume information table 416, in the updated block address management table 220, the stored number that corresponds to the primary volume PLU being a target is updated from "2" to "3," and the stored array number is also updated from "2" to "3".

The CPU 201 of the virus-scan device 200 specifies the number of the primary volume PLU storing data that is a target for virus-scan, and sends a "snapshot creation command" to the storage device 300 (S115).

The CPU 401 of the storage device 300 activates a snapshot control program 413, creates the snapshot volume SLU of the designated primary volume PLU, and pairs up the aforementioned primary volume PLU and the aforementioned snapshot volume SLU (S116).

The CPU 201 of the virus-scan device 200 sends again the "updated block information save command" to the storage device 300, using the updated block address manager 216 via the schedule manager 214 (S117).

When the CPU 401 of the storage device 300 receives the "updated block information save command," it activates an updated block address save program. 412, initializes the memory area of the designated primary volume PLU, thereby resetting blocks in a bitmap (S118).

When the CPU 201 of the virus-scan device 200 finishes saving updated block address information in a save destination volume ULU created in the storage device 300, the CPU 201 of the virus-scan device 200 sends an "I/O resume command" to the SUTOSEN PC 100, by using a PC controller 217 via schedule manager 214 (S119).

When the SUTOSEN PC 100 receives the "I/O resume command," it activates an I/O control program 113, thereby resuming sending write block data to the storage device 300 (S120).

The CPU 201 of the virus-scan device 200 activates a storage management program 212, and maps a save destination volume ULU and a snapshot volume SLU to a management target 320 by using an updated file creation unit 215. Then, the CPU 201 of the virus-scan device 200 activates a storage connection program 213, mounting the management target 320 on the OS (Operating System) of the virus-scan device (S121).

The CPU 201 of the virus-scan device 200 retrieves as much updated block address information as is stored (generation number) within a save destination volume ULU, and determines an updated block address BA#m and an updated block volume, by using an updated file creation unit 215. Then, the CPU 201 of the virus-scan device 200 registers the determined update block volume in a virus-scan execution management table 218 (S122).

Also, the CPU 201 of the virus-scan device 200 determines an actual used volume from a created snapshot volume SLU by using the updated file creation unit 215, and registers the determined actual used volume in the virus-scan execution management table 218 (S122).

The CPU 201 of the virus-scan device 200 searches only for an updated file from the save destination volume ULU and snapshot volume SLU, by using the updated file creation unit 215 (S123).

Specifically, the CPU 201 of the virus-scan device 200 refers to i-node information on a file in the snapshot volume SLU, and searches for an updated block address BA#m indicating an updated file from the save destination volume ULU. Then, the CPU 201 of the virus-scan device 200 finds a LBA on a hard disk drive 500; the LBA corresponds to the updated block address BA#m.

Note that i-node information is file attribute information including the holder's name, the file length, the time stamp, and the data block address of a file or similar.

If the CPU 201 of the virus-scan 200 judges that the LBA on the hard disk drive 500 does not contain the updated block address BA#m (S123: NO), it sets the length of the file length in the i-node information to zero (S124). More specifically, the CPU 201 of the virus-scan 200 sets an LBA not containing an updated block address not to be a target for virus-scan.

The CPU 201 of the virus-scan device 200 searches for updated files with respect to all files within the snapshot volume SLU, the LBA on the hard disk drive 500 contains the updated block address BA#m (S123: YES), and creates an updated volume RLU composed of updated data (S125).

The CPU of the virus-scan device 200 activates a virus-scan engine program 210, and virus-scans the created update volume RLU using the schedule manager 214 (S126).

The updated block volume will be approximately 5 GB in a week. If an actual used volume and the updated block volume are about the same size, it takes an unnecessarily long time for the processing to search for an updated file from an updated block address and to execute virus-scan for the aforementioned file (S126). Thus, the CPU 201 calculates an update ratio from an actual used volume and the updated block volume, and if the updated ratio is less or equal the threshold value, the CPU 201 performs virus-scan on the updated file retrieved with the updated block address (S126), and if the updated ratio exceeds the threshold value, the processing to execute virus-scan can be not performed on the updated file retrieved with the updated block address (S126).

If the updated ratio exceeds the threshold value, the CPU 201 performs virus-scan on the whole volume of the snapshot volume SLU.

The updated ratio can be calculated using the formula (1) below:

$$((\text{update block ratio}/\text{actual used volume})\times 100). \tag{1}$$

Furthermore, threshold value can be calculated using an updated ratio of the following formula (2):

$$\begin{aligned}&(\text{Processing time for virus-scan performed on whole}\\&\quad\text{volume of snapshot volume SLU})>(\text{Processing}\\&\quad\text{time for virus-scan performed on update volume}\\&\quad\text{RLU storing updated file only}).\end{aligned} \tag{2}$$

The CPU 201 of the virus-scan device 200 unmounts the save destination volume ULU and the updated volume RLU from the OS of the virus-scan device 200, and unmaps them from the management target 320, using the schedule manager 214 (S127).

The CPU of the virus-scan device 200 sends a "snapshot cancel command" to the storage device 300 using the schedule manager 214 (S128).

When the CPU 401 of the storage device 300 receives the "snapshot cancel command," the CPU 401 activates the snapshot control program 413, and cancels the pair of the primary volume LU and the snapshot volume SLU used as the basis for an updated volume RLU for which a virus-scan is completed (S129).

The CPU 201 of the virus-scan device 200 registers an execution date and an execution time in the virus-scan execution management table 218 using the schedule manager 214 (S130).

The CPU 201 of the virus-scan 200 judges whether or not, after performing the virus-scan, an updated file is infected by a virus (S135), and if not infected, the CPU 201 terminates the virus-scan execution processing accordingly.

Meanwhile, if the CPU 201 of the virus-scan device 200 judges that an updated file is infected by a virus, (S131: YES), the CPU 201 executes virus disinfection processing described below (S132), and terminates the virus-scan execution processing.

(3-4) Virus Disinfection Processing

Next, virus-scan disinfection processing when virus infection is detected will be described below.

First, as shown in FIGS. 15 to 18, it is necessary to perform virus-disinfection on a primary volume PLU, so the CPU 201 of the virus-scan device 200 sends a "volume unmount command" to the SUTOSEN PC 100, by using a PC controller via a schedule manager 214 (S140).

The SUTOSEN PC 100 unmounts the primary volume PLU from the OS of the SUTOSEN PC 100 by activating mount processing program 112 (S141).

Then, the CPU 201 of the virus-scan device 200 sends an "updated block information save command" to the storage device 300, by using an updated block address manager 216 via the schedule manager 214 (S142). This is for the CPU 201 to perform virus-scan on a block, which is updated by writing a primary volume PLU while executing virus-scan in step S126.

The CPU 201 of the virus-scan device 200 calculates the stored location of an updated block from the updated block size and stores an array number in an updated block management table 220 using the updated block address manager 216; and the CPU 201 reports the number of the primary volume PLU connected to the SUTOSEN PC 100, the number of the save destination volume ULU and the stored location of the updated block to the storage device 300 (S143).

When the CPU 401 of the storage device 300 receives the "updated block information save command," it activates update block address save program 412, and copies the updated block address information on the designated primary volume PLU to the designated save destination volume ULU (S144).

However, the save destination volume ULU holds the updated block address information only temporarily, so the CPU 401 does not perform the same procedure as that of step S114, namely, updating the stored number, the stored array number and the last save date in an updated block address management table 220.

The CPU 201 of the virus-scan 200 activates storage management program 212, and maps a save destination volume ULU and a primary volume PLU to a management target 320 using an updated file creation unit 215. Then, the CPU 201 of the virus-scan 200 activates storage connection program 213, and mounts the management target 320 on the OS (Operating System) of the virus-scan device 200 (S145).

The file infected with a virus is reported, as the result of a virus-scan, to a virus-scan device (S126), so the CPU 201 of the virus-scan device 200 disinfects only the infected file from a primary volume PLU using the updated file creation unit 215 (S146).

Next, the CPU 201 of the virus-scan device 200 searches only for an updated file from a save destination volume ULU and a primary volume PLU using the updated file creation unit 215 (S145). This is for the CPU 201 to perform virus-scan execution processing and virus disinfection processing on an area of a primary volume PLU where a new record is written while executing virus-scan in step S126.

More specifically, the CPU 201 of the virus-scan 200 refers to i-node information on a file in a primary volume PLU, and retrieves an updated block address BA#n indicating an updated file from the save destination volume ULU, by using the updated file creation unit 215. Then, the CPU 201 of the virus-scan device 200 finds a LBA that corresponds to the updated block address BA#n on a hard disk drive 500.

In this way the CPU of the virus-scan device 200 performs steps S147 to S150 in the same manner as steps S123 to S126 to execute a virus-scan.

Also, the CPU 201 of the virus-scan device 200 performs steps S151 and S152 in the same manner as steps S131 and S132, so that when an updated file is infected by a virus, the CPU 201 executes virus disinfection processing. In the virus disinfection processing, the CPU 201 performs steps S140 to S146.

Then, the CPU 201 of the virus device 200 unmounts the save destination volume ULU and primary volume PLU from the OS of the virus-scan device, and unmaps them from the target 320, using the schedule manager 214 (S153).

The CPU 201 of the virus-scan device 200 sends a "updated block information record start command" to the storage device 300 (S154).

The CPU 401 of the storage device 300 activates an updated block address save program 412, and after it initiates the memory area of the designated primary volume PLU, records the update of the file (S155).

The CPU 201 of the virus-scan device 200 sends a "volume mount command" to the SUTOSEN PC 100 using a PC controller 217 via the schedule manager 214 (S156).

When the CPU 101 of the SUTOSEN PC 100 receives the "volume mount command," the CPU 101 activates a mount processing program 112, and mounts the disinfected primary volume PLU on the OS of the SUTOSEN PC 100 (S157), and then it terminates the virus disinfection processing.

(4) Another Embodiment

As a means for copying updated block address information to a save destination volume ULU, the above embodiment described that a save destination volume is created within a storage device 300; and when an update block address save program 412 in the storage device 300 receives an "updated block information save command," it copies updated block address information on the designated primary volume PLU to the designated save destination volume ULU. As another means for copying updated block address information to save destination volume ULU, it is also possible that, the CPU 201 of the virus-scan device 200 sends an "updated block information save command" to a storage device 300 using an updated address manager 216 via a schedule manager 214; and when the CPU 401 of the storage device 300 receives the "updated block information save command," it activates update block address save program 412, and transfers updated block address information on the designated primary volume PLU to an updated block address manager 216 via a management I/O interface 405. It is also possible that an updated block address manager 216 copies updated block address information to a save destination volume ULU.

Furthermore, as a means for virus-scanning only an updated file, in the above described embodiment, when a LBA is judged as not containing an updated block address BA#m, the length of the file length in i-node information was set to zero. As another means for virus-scanning only an updated file, it is possible to create a folder A within a snapshot volume SLU; refer to i-node information on a file within the snapshot volume SLU; retrieve an updated block address BA#m indicating an updated file from a save destination volume ULU; and if an LBA contains the updated block address BA#m, create a link to this file in the folder A, so that the CPU 201 of the virus-scan device 200 activates a virus-scan engine program 210 and perform a virus-scan on the folder A in the created update volume PLU using a schedule manager 214.

(5) Advantageous Effects of the Embodiment

As described above, in the present embodiment, only an updated file can be a target for a virus-scan, therefore it is not necessary to virus-scan all primary volumes, so the workload on a computer can be reduced.

In practice, the updated block volume in a primary volume will be approximately 5 GB in a week. If a virus-scan is operated in a manner where updates for an entire week are always virus-scanned in a day, an updated volume RLU, being equivalent to a block whose size is about 5 GB, will be virus-scanned daily. An updated volume RLU of a size equivalent to 5 GB can be virus-scanned in about 20 minutes, so the time for virus-scan can be reduced to one-sixth compared with a conventional case with a virus-scan performed on a logical volume LU of size 30 GB. The size of a block update volume stays constant regardless of the size of a logical volume, so the larger the size of a logical volume, the more effective the embodiment can be.

So far, seventeen virus-scan devices have been necessary to virus-scan a logical volume with a size equivalent to two-hundred SUTOSEN PCs. However, since one virus-scan device can perform a virus-scan on a logical volume equivalent to 72 SUTOSEN PCs in a day, three virus-scan devices will be enough to perform a virus-scan on a logical volume with a size equivalent to two-hundred SUTOSEN PCs.

The present embodiment is capable of full-scanning the logical volume of a SUTOSEN PC with high frequency while limiting the number of virus-scan devices.

The present invention can broadly applied in computer systems having one or more storage devices.

What is claimed is:

1. A computer system including a personal computer, a virus-scan device and a storage device storing data from the personal computer in a plurality of logical volumes arranged in memory areas of one or a plurality of hard disk drives, wherein,
the plurality of logical volumes comprises,
a primary volume that is a target for a virus-scan, the primary volume configured to store data from the personal computer;
a snapshot volume configured to store the status of the primary volume at a given point in time; and
a save destination volume configured to store a copy of an updated block address from the primary volume corresponding to an updated memory area within the primary volume, an indication of an updated status of the updated memory area reflected in a bitmap;
wherein,
the storage device suspends input and output exchange with the personal computer prior to the save destination volume storing the copy of an updated block address,
the storage device copies updated block address information of the primary volume to the save destination volume and creates the snapshot volume of the primary volume,
the personal computer suspends input/output (I/O) to the storage device before the copy and resumes I/O to the storage device after accomplishing the copy, and
the virus-scan device mounts the save destination volume and the snapshot volume;
detects only an updated file in the primary volume from the snapshot volume and the save destination volume;
creates an updated volume for storing a relevant updated file;
executes a virus-scan on the updated volume;
when the updated volume is infected,
mounts the primary volume; and
disinfects only the updated file in the primary volume by referring to the result of the virus-scan.

2. The computer system according to claim 1, wherein, an address on the hard disk can be found from attribute information on the file; and when information on the updated block address does not contain the address on the hard disk, the file length of a file stored in the address is set to zero so that only the updated file can be detected.

3. The computer system according to claim 2, wherein, the save destination volume stores information on the updated block address for a plurality of block updates.

4. The computer system according to claim 3, wherein, a virus-scan is executed when an updated ratio calculated from an actual used volume indicating a memory area, from among the memory areas within a target primary volume PLU, that stores data and an updated block volume indicating a memory area in which data is updated is below a threshold value calculated from processing time for executing a virus-scan on the snapshot volume and processing time for executing a virus-scan on the updated volume.

5. The computer system according to claim 1, wherein the information of the update block address is accessible by at least one device external to the storage device.

6. The computer system according to claim 5, wherein the at least one device includes a plurality of virus-scan devices.

7. The computer system according to claim 1, further comprising a virus-scan device configured to identify a file corresponding to an updated block address.

8. A virus-scan method in a computer system including a personal computer, a virus-scan device and a storage device storing data from the personal computer in a plurality of logical volumes arranged in memory areas of one or a plurality of hard disk drives, the virus-scan method comprising the steps of:
suspending input/output (I/O) between the personal computer and the storage device;
copying an updated block address information of a primary volume to a save destination volume, the primary volume being a target for a virus-scan and being configured to store data from the personal computer, and the save destination volume being configured to store a copy of an updated block address from the primary volume corresponding to an updated memory area within the primary volume, an indication of an updated status of the updated memory area reflected in a bitmap; creating a snapshot volume of the primary volume, the snapshot volume being configured to store the status of the primary volume at a given point in time; resuming I/O between the personal computer and the storage device after the copying,
mounting, by the virus-scan device, the save destination volume and the snapshot volume;
creating an updated volume for storing a relevant updated file;
executing a virus-scan on the updated volume;
when the updated volume is infected,
mounting, by the virus-scan device, the primary volume; and
disinfecting only the updated file in the primary volume by referring to the result of the virus-scan.

9. The virus-scan method according to claim 8, wherein, an address on the hard disk can be found from attribute information on the file; and when information on the updated block address does not contain the address on the hard disk, the file length of a file stored in the address is set to zero so that only the updated file can be detected.

10. The virus-scan method according to claim 9, the virus-scan method further comprising:
a step of storing information on the updated block address in the save destination volume for a plurality of block updates.

11. The virus-scan method according to claim 10, the virus-scan method further comprising:
a step of calculating an updated ratio from an actual used volume indicating a memory area, from among the memory areas within a target primary volume PLU, that stores data and an updated block volume indicating a memory area in which data is updated;

a step of calculating a threshold value from processing time for executing a virus-scan on the snapshot volume and processing time for executing a virus-scan on the updated volume; and a step of executing a virus-scan when the updated ratio is below the threshold value.

* * * * *